US010303762B2

(12) United States Patent
Markman et al.

(10) Patent No.: US 10,303,762 B2
(45) Date of Patent: May 28, 2019

(54) COMPREHENSIVE SAFETY SCHEMA FOR ENSURING APPROPRIATENESS OF LANGUAGE IN ONLINE CHAT

(71) Applicant: Disney Enterprises, Inc., Burbank, CA (US)

(72) Inventors: Vita Markman, Los Angeles, CA (US); Sean O'Dell, West Hills, CA (US); Drew Beechum, Pasadena, CA (US); Paul Pak, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 185 days.

(21) Appl. No.: 13/873,455

(22) Filed: Apr. 30, 2013

(65) Prior Publication Data

US 2014/0278367 A1    Sep. 18, 2014

Related U.S. Application Data

(60) Provisional application No. 61/801,088, filed on Mar. 15, 2013.

(51) Int. Cl.
G06F 17/27    (2006.01)

(52) U.S. Cl.
CPC ........ *G06F 17/2765* (2013.01); *G06F 17/274* (2013.01); *G06F 17/2785* (2013.01)

(58) Field of Classification Search
CPC . G06F 17/2785; G06F 17/274; G06F 17/2765

(Continued)

(56) References Cited

U.S. PATENT DOCUMENTS

| 5,678,051 A | 10/1997 | Aoyama |
| 6,139,201 A | 10/2000 | Carbonell et al. |

(Continued)

FOREIGN PATENT DOCUMENTS

| WO | 02070088 A1 | 9/2002 |
| WO | 2004001558 A2 | 12/2003 |
| WO | 2008109680 A1 | 9/2008 |

OTHER PUBLICATIONS

Faguo et al "Research on Short Text Classification Algorithm Based on Statistics and Rules," Third International Symposium on Electronic Commerce and Security, 2010, pp. 3-7.*

(Continued)

*Primary Examiner* — Lamont M Spooner
*Assistant Examiner* — Oluwadamilola M Ogunbiyi
(74) *Attorney, Agent, or Firm* — Patterson + Sheridan, LLP

(57) ABSTRACT

A method is disclosed for evaluating a chat message sent between users of an online environment. The method may include associating each word in the chat message with metadata. The metadata identifies a word type and usage for each word in the chat message. This method may also include identifying one or more safety rules associated with the metadata. Each safety rule identifies an ordered sequence of one or more sets of words. This method may also include applying the safety rule to the chat message to determine whether a sequence of words in the chat message present in the ordered sequence of sets of words. Upon determining a word, from each set of words in the ordered sequence of sets of words, matches a respective one of the words in the chat message, the chat message is blocked from being sent to a message recipient.

24 Claims, 7 Drawing Sheets

(58) Field of Classification Search
USPC .......................................................... 704/9
See application file for complete search history.

(56) References Cited

U.S. PATENT DOCUMENTS

| | | | |
|---|---|---|---|
| 6,199,034 B1* | 3/2001 | Wical | G06F 17/2785 704/9 |
| 6,470,306 B1 | 10/2002 | Pringle et al. | |
| 7,027,974 B1 | 4/2006 | Busch et al. | |
| 7,240,093 B1 | 7/2007 | Danieli | |
| 7,356,188 B2* | 4/2008 | Venkatesan et al. | 382/229 |
| 7,437,290 B2* | 10/2008 | Danieli | 704/251 |
| 7,603,413 B1* | 10/2009 | Herold et al. | 709/204 |
| 7,913,176 B1 | 3/2011 | Blattner | |
| 8,015,051 B2 | 9/2011 | Chen et al. | |
| 8,117,287 B2 | 2/2012 | Washburn | |
| 8,359,642 B1* | 1/2013 | Wurtenberger et al. | 726/7 |
| 8,606,726 B2 | 12/2013 | Wurzer | |
| 8,666,982 B2* | 3/2014 | Rajpathak et al. | 707/736 |
| 8,719,006 B2 | 5/2014 | Bellegarda | |
| 8,965,982 B1 | 2/2015 | Sanjeev | |
| 9,122,674 B1 | 9/2015 | Wong et al. | |
| 9,165,329 B2 | 10/2015 | Beechum et al. | |
| 9,245,253 B2 | 1/2016 | Markman et al. | |
| 9,713,774 B2 | 7/2017 | Hoomani et al. | |
| 2001/0029455 A1 | 10/2001 | Chin et al. | |
| 2002/0049805 A1 | 4/2002 | Yamada et al. | |
| 2002/0059379 A1 | 5/2002 | Harvey et al. | |
| 2002/0062349 A1 | 5/2002 | Maehiro et al. | |
| 2002/0140726 A1 | 10/2002 | Schwartz et al. | |
| 2003/0009495 A1* | 1/2003 | Adjaoute | 707/501.1 |
| 2003/0097406 A1 | 5/2003 | Stafford | |
| 2003/0187632 A1 | 10/2003 | Menich | |
| 2004/0078192 A1 | 4/2004 | Poltorak | |
| 2004/0102957 A1 | 5/2004 | Levin | |
| 2004/0111479 A1 | 6/2004 | Borden et al. | |
| 2004/0153557 A1* | 8/2004 | Shochet | H04L 51/04 709/229 |
| 2005/0038650 A1 | 2/2005 | Bellegarda et al. | |
| 2005/0060140 A1* | 3/2005 | Maddox | G06F 17/30684 704/4 |
| 2005/0076247 A1 | 4/2005 | Wittkotter | |
| 2005/0137851 A1 | 6/2005 | Ryu et al. | |
| 2005/0154580 A1 | 7/2005 | Horowitz et al. | |
| 2005/0203747 A1 | 9/2005 | Lecoeuche | |
| 2005/0240439 A1 | 10/2005 | Covit et al. | |
| 2005/0278413 A1 | 12/2005 | Tannenbaum | |
| 2005/0288931 A1 | 12/2005 | Kaneko et al. | |
| 2006/0003838 A1 | 1/2006 | Kobayashi et al. | |
| 2006/0015324 A1 | 1/2006 | Pan et al. | |
| 2006/0074670 A1* | 4/2006 | Weng | G10L 15/22 704/257 |
| 2006/0090137 A1 | 4/2006 | Cheng et al. | |
| 2006/0095556 A1 | 5/2006 | Arnold et al. | |
| 2006/0123338 A1* | 6/2006 | McCaffrey | G06F 17/2294 715/234 |
| 2006/0129633 A1 | 6/2006 | Potluri et al. | |
| 2006/0241944 A1* | 10/2006 | Potter | G06F 17/2795 704/254 |
| 2007/0016401 A1 | 1/2007 | Ehsani et al. | |
| 2007/0106742 A1* | 5/2007 | Bellegarda | G06Q 10/107 709/206 |
| 2007/0118357 A1 | 5/2007 | Kasravi et al. | |
| 2007/0150426 A1 | 6/2007 | Asher et al. | |
| 2007/0168511 A1 | 7/2007 | Brochu et al. | |
| 2007/0213975 A1 | 9/2007 | Shimoda et al. | |
| 2008/0071521 A1 | 3/2008 | Larvet | |
| 2008/0098115 A1 | 4/2008 | Bouillet et al. | |
| 2008/0137629 A1 | 6/2008 | Ko et al. | |
| 2008/0147408 A1 | 6/2008 | Da Palma et al. | |
| 2008/0162125 A1* | 7/2008 | Ma et al. | 704/222 |
| 2008/0168095 A1 | 7/2008 | Larcombe et al. | |
| 2008/0195571 A1 | 8/2008 | Furuuchi et al. | |
| 2008/0215519 A1 | 9/2008 | Runge et al. | |
| 2008/0221998 A1 | 9/2008 | Mendelsohn et al. | |
| 2008/0263159 A1* | 10/2008 | Choi | H04L 12/585 709/206 |
| 2008/0275692 A1 | 11/2008 | Chen et al. | |
| 2008/0288241 A1 | 11/2008 | Noda | |
| 2009/0029960 A1 | 1/2009 | Betschart et al. | |
| 2009/0049513 A1 | 2/2009 | Root et al. | |
| 2009/0063127 A1 | 3/2009 | Izuha | |
| 2009/0132528 A1 | 5/2009 | Albomoz et al. | |
| 2009/0177981 A1 | 7/2009 | Christie | |
| 2009/0210803 A1 | 8/2009 | Brignull et al. | |
| 2009/0245500 A1 | 10/2009 | Wampler | |
| 2009/0253513 A1 | 10/2009 | Ducheneaut et al. | |
| 2009/0271180 A1 | 10/2009 | Balegar et al. | |
| 2009/0299925 A1 | 12/2009 | Ramaswamy | |
| 2009/0299960 A1 | 12/2009 | Lineberger | |
| 2009/0319915 A1 | 12/2009 | Bates et al. | |
| 2010/0010800 A1 | 1/2010 | Rehberg | |
| 2010/0050074 A1 | 2/2010 | Nachmani et al. | |
| 2010/0057463 A1 | 3/2010 | Weng et al. | |
| 2010/0099444 A1* | 4/2010 | Coulter et al. | 455/466 |
| 2010/0100371 A1 | 4/2010 | Yuezhong et al. | |
| 2010/0153219 A1 | 6/2010 | Mei et al. | |
| 2010/0169769 A1 | 7/2010 | Jimenez et al. | |
| 2010/0174813 A1* | 7/2010 | Hildreth et al. | 709/224 |
| 2011/0092221 A1 | 4/2011 | Zubas et al. | |
| 2011/0107239 A1 | 5/2011 | Adoni et al. | |
| 2011/0113112 A1* | 5/2011 | Ganz | G06F 17/2765 709/206 |
| 2011/0154224 A1 | 6/2011 | Bates et al. | |
| 2011/0184718 A1 | 7/2011 | Chen | |
| 2011/0191105 A1* | 8/2011 | Spears | G06F 17/30867 704/251 |
| 2011/0201287 A1 | 8/2011 | Pratt et al. | |
| 2011/0201387 A1 | 8/2011 | Paek et al. | |
| 2011/0202611 A1 | 8/2011 | Malik et al. | |
| 2011/0270771 A1 | 11/2011 | Coursimault et al. | |
| 2011/0270820 A1 | 11/2011 | Agarwal et al. | |
| 2012/0036147 A1* | 2/2012 | Borst | H04L 12/585 707/769 |
| 2012/0041903 A1 | 2/2012 | Beilby et al. | |
| 2012/0054645 A1 | 3/2012 | Hoomani et al. | |
| 2012/0072404 A1 | 3/2012 | Murphy et al. | |
| 2012/0101970 A1 | 4/2012 | Zernik et al. | |
| 2012/0166183 A1 | 6/2012 | Suendermann et al. | |
| 2012/0191445 A1 | 7/2012 | Markman et al. | |
| 2012/0240062 A1 | 9/2012 | Passmore et al. | |
| 2012/0272160 A1* | 10/2012 | Spivack | G06Q 10/10 715/752 |
| 2012/0323565 A1 | 12/2012 | Hildreth et al. | |
| 2013/0046791 A1 | 2/2013 | Markman et al. | |
| 2013/0047099 A1* | 2/2013 | Markman | G06F 17/274 715/758 |
| 2013/0091227 A1 | 4/2013 | Bhakar et al. | |
| 2013/0116044 A1* | 5/2013 | Schwartz | A63F 13/12 463/29 |
| 2013/0159869 A1* | 6/2013 | Faraji | 715/738 |
| 2014/0074923 A1* | 3/2014 | Vasudevan et al. | 709/204 |
| 2014/0114895 A1 | 4/2014 | Beechum et al. | |
| 2014/0297266 A1* | 10/2014 | Nielson | G06F 17/275 704/9 |

OTHER PUBLICATIONS

Max Kaufmann: "Syntactic Normalization of Twitter Messages", The 8-th International Conference on Natural Language Processing, Jan. 1, 2010 (Jan. 1, 2010).

Ghayoomi M et al: "An overview on the existing language models for prediction systems as writing assistant tools", Systems, Man and Cybernetics, 2889. SMC 2889. IEEE International Conference on, IEEE, Piscataway, NJ, USA, Oct. 11, 2889 (2889-18-11), pp. 5883-5887.

Hunnicutt S Ed—Tubach J P et al: "Using Syntactic and Semantic Information in a Word Prediction Aid", Proceedings of the European Conference on Speech Communication and Technology (EUROSPEECH). Paris, Sep. 26-28, 1989; [Proceedings of the European Conference on Speech Communication and Technology

(56) References Cited

OTHER PUBLICATIONS (EUROSPEECH)], Edinburgh, CEP Consultants, GB, vol. 1, Sep. 26, 1989 (1989-89-26), pp. 191-193.

Park et al. "Communication Supports for Building World Wide Internet Game Communities". Entertainment. Computing-ICEC 2006, pp. 370-373.

Mine et al. "Building a massively Multiplayer Game for the Million: Disney's Toontown Online". Computers in Entertainment (CIE) 1.1, Oct. 2003, pp. 1-20.

Boehret, Katherin; "The Mossberg Solution: Rating the New Instant-Messaging Programs"; Feb. 7, 2007; Wall Street Journal; Eastern edition; New York, N.Y. (0099-9660). P.D.1.

Method for Chat Spam Prevention in a Virtual World, Oct. 31, 2008, IP.com.

European Search Report for Application No. 12180939.6; dated Oct. 2, 2013.

European Search Report for Application No. 12180938.8; dated Oct. 2, 2013.

European Search Report for Application No. 13189585.6; dated Dec. 12, 2013.

International Search Report and Written Opinion of the International Search Authority for PCT/US2011/049708 dated Nov. 30, 2011.

U.S. Appl. No. 14/059,306; entitled "Real-Time Search and Validation of Phrases Using Linguistic Phrase Components", filed Oct. 21, 2013.

Montero et al. "Unsupervised language independent genetic algorithm approach to trivial dialougue phrase generation and evaluation." Natural Language Processing and Information Systems. Springer Berlin Heidelberg, 2007, pp. 388-394.

Xu et al. "Filtering offensive language in online communities using grammatical relations." Proceedings of the Seventh Annual Collaboration, Electronic Messaging, Anti-Abuse and Spam Conference. Jul. 2010, pp. 1-10.

Montero et al. "Is it correct?: towards web-based evaluation of automatic natural language phrase generation." Proceedings of the COLING/ACL on interactive presentation sessions. Association for Computational Linguistics, Jul. 2006, pp. 5-8.

Langkilde et al. "Generation that exploits corpus-based statistical knowledge." Proceedings of the 36th Annual Meeting of the Association for Computational Linguistics and 17th International Conference on Computational Linguistics—vol. 1. Association for Computational Linguistics, May 1998, pp. 704-710.

Iordanskaja et al. "Lexical selection and paraphrase in a meaning-text generation model." Natural language generation in artificial intelligence and computational linguistics. Springer US, 1991, pp. 293-312.

Harbusch et al. "The Sentence Fairy: a natural-language generation system to support childrens essay writing." Computer Assisted Language Learning 21.4, Oct. 2008, pp. 339-352.

Callaway, et al. "Narrative prose generation." Artificial Intelligence 139.2, Aug. 2002, pp. 213-252.

Ranaparkhi, Adwait. "Trainable approaches to surface natural language generation and their application to conversational dialog systems." Computer Speech & Language 16.3, Oct. 2002, pp. 435-455.

Dinh, Dien, et al. "Learning Transfer Rules from Annotated English-Vietnamese Bilingual Corpus." IPSJ SIG Technical Report, Dec. 2004, pp. 31-36.

Toutanova, et al. "Extensions to HMM-based statistical word alignment models." Proceedings of the ACL-02 conference on Empirical methods in natural language processing—vol. 10. Association for Computational Linguistics, Jul. 2002, pp. 87-94.

\* cited by examiner

COMPREHENSIVE SAFETY SCHEMA FOR ENSURING APPROPRIATENESS OF LANGUAGE IN ONLINE CHAT

CROSS-REFERENCE TO RELATED APPLICATION

This application claims benefit of U.S. Provisional Patent Application Ser. No. 61/801,088 filed Mar. 15, 2013, which is incorporated herein by reference in its entirety.

BACKGROUND

Field

Embodiments of the invention are generally directed to online communication. More specifically, embodiments of the invention are directed to techniques for managing the content of chat messages exchanged between users in online environments.

Description of the Related Art

Multiplayer video games and virtual worlds are popular forms of online entertainment, particularly for minors. Both provide users with access to a virtual environment where they may interact with one another. For example, avatars are frequently used to provide a graphical representation of each user present within a virtual environment and users interact with one another through their avatars. Users control the actions of their avatar to navigate the virtual environment, e.g., achieve gaming objectives as well as to communicate or chat with other users. Such an environment may be persistent where events occur and users interact with each other regardless of the presence of any particular user. Alternatively, such an environment may be game or session based, e.g., where a group of users participate in a match of a first-person shooter game.

User-to-user communication (i.e., chatting) is a prominent feature within these online environments. For example, a user may chat directly with other users present in the same virtual location by typing characters into a text-field on a user interface. To promote civility and safety among users, a service provider hosting an online environment may desire to prevent the use of obscene language or other inappropriate communication, particularly in online environments developed for minors. In such a case, chat software may filter chat messages by removing swear words, slurs, or other known terms of disparagement. However, simply filtering "bad" words is inadequate as inappropriate messages are plainly not limited to simply "bad" words.

Accordingly, in some cases, a chat interface may prevent users from freely composing chat messages. Instead, users chat by selecting messages from a predetermined set of words or phrases. One constraint of such a system is that the set of allowed words or phrases must be defined in advance. In such cases, however, users have to type a chat message that exactly matches one of the allowed ones (or select an allowed one from a list). In practice, this greatly restricts the expressivity of users within the virtual environment. For example, if the allowed messages includes the phrase "I want to play chess," but does not contain the phrase "I want to play checkers," the second phrase cannot be sent. At the same time, entering all possible phrases is costly, time consuming, and generally unrealistic.

To provide a safe environment, providers engage monitor and filter the behavior of guests, including monitoring and reviewing chat messages. At a base level, providers prevent the use of obvious profanity. The greater challenge is stopping offending behavior of a more subtle linguistic nature such as the use of an inappropriate metaphors or via spelling bad words phonetically across a line (e.g. "neh kid" to say "naked"). Offending behavior for cybersex, violence, cyber-bullying, and the passing of personally identifying information has proven difficult to identify in conventional chat filters. Additionally, online language evolves rapidly and it is difficult to predict words/expressions that will acquire pejorative meaning

SUMMARY

One embodiment of the invention includes a computer-implemented method for evaluating a chat message sent between users of an online environment. The method may include associating each word in the chat message with metadata. The metadata identifies a word type and usage for each word in the chat message. This method may also include identifying one or more safety rules associated with the metadata. Each safety rule identifies an ordered sequence of one or more sets of words. This method may also include applying the safety rule to the chat message to determine whether a sequence of words in the chat message present in the ordered sequence of sets of words. Upon determining a word, from each set of words in the ordered sequence of sets of words, matches a respective one of the words in the chat message, the chat message is blocked from being sent to a message recipient.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
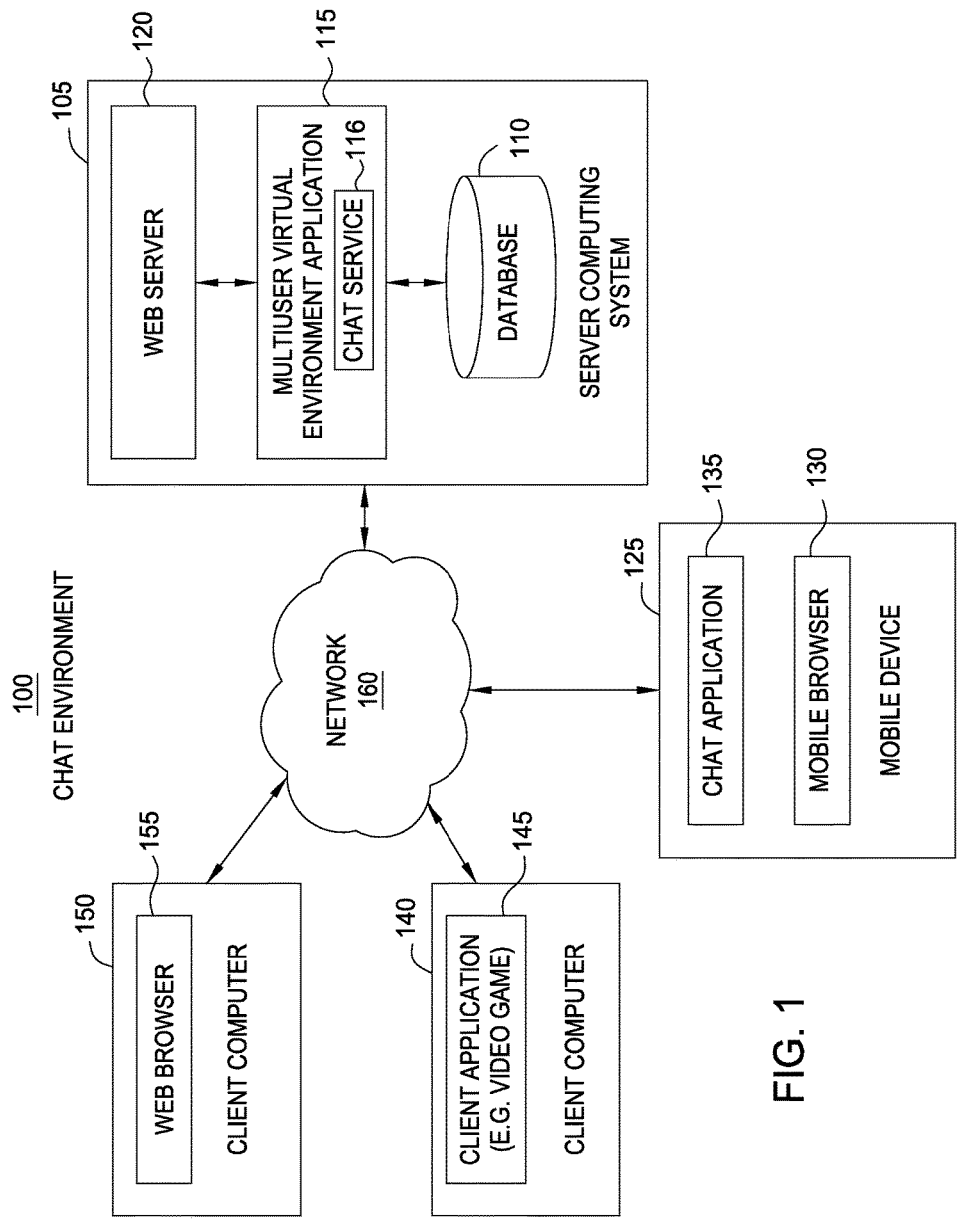
FIG. 1 illustrates a computing infrastructure configured to provide a safe and effective chat environment, according to one embodiment of the invention.

Embodiments of the invention provide a variety of techniques for supplying users with a safe and effective chat environment. The chat environment is "safe" in the sense that the ability of a user to compose an inappropriate message is greatly restricted, while "effective" in the sense that users are still allowed a broad range of expressivity in composing and exchanging chat messages. In one embodiment, users exchange message while participating in an online virtual environment. Alternatively, users may be exchanging messages in an asynchronous manner (e.g., as SMS messages sent between mobile telephones).

In one embodiment, a comprehensive safety schema is provided to promote expressivity and safety. A system implementing the safety schema may include: a semantic component for blocking inappropriate metaphors; a phonetic-based component for blocking combinations of "good" words that are used to spell, or otherwise infer, "bad" words or otherwise convey an inappropriate meaning; and a trending component for discovering new or new uses of words. Good words are those words which, when alone, would not be inappropriate. For instance, "banana" by itself is a merely a fruit which may be eaten. Perfectly safe. However when used in conjunction with other words as discussed below, the meaning may change.

The semantic component controls the use of unsafe metaphors, i.e. the use of good words to produce inappropriate metaphorical expressions. The schema provides a method to identify combinations of good words which may also have an alternatively dubious connotation. (e.g. "swallow banana").

The phonetic component provides controls for the 'sound'-based spelling abuse of language, i.e. the use of good words to construct an inappropriate message (e.g. "neck kid" to spell "naked"). The schema provides a method to derive possible combinations of good words that can be used to sound out bad words.

The trending component provides a method for monitoring trends in the usage of words or phrases to reveal new expressions that would be otherwise difficult to identify in a timely manner. Trending can lead to prioritized review of words or phrases that appear in contexts associated with inappropriate chat, e.g., contain surrounding words that are characteristic of unsafe language. In addition, language trends can enhance guest experience by integrating novel safe phrases.

The safety schema may be added as an independent component to existing online chat systems such as white list chat, black list chat or even dynamic chat classifiers (dynamic chat classification engine. However, the safety schema is not inherently linked to dynamic chat and can also be used as an independent safety mechanism.

Note, while discussed separately, the techniques for supplying users in an online environment with a safe and effective chat facility, one of ordinary skill in the art will recognize that the disclosed techniques may be combined, to operate in conjunction with one another as well as combined with other techniques for managing a chat facility provided to users of a virtual environment. Further, while some functionality is described as being provided by server components and some by client components, such distinctions are made to facilitate the following description. Further still, while virtual online environments are described as an environment where monitoring chat functionality may be useful, the approaches described herein may be adapted for use in variety of situations where individuals use software to send chat messages to one another. For example, in addition to a chat facility within a virtual world, embodiments may be used to manage chat messages exchanged between individuals sent as SMS messages on mobile telephones or messages sent using a variety of different software applications and/or chat protocols.

Additionally, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates an example computing environment, according to one embodiment. As shown, the chat environment 100 includes network 160 connecting a server computing system 105, a client computer 140 and 150, and a mobile device 125. The server computing system 105 has a web-server 120, a multiuser virtual environment application 115 and a database 110. The multiuser virtual environment application 115 has a chat service 116. The client computer 150 has a web-browser 155, and the client computer 140 has an application 145 such as a video game. The mobile device 125 has both a chat application 135 and a mobile browser 130.

The communication on the network 160 may be a wireless or wired protocol and the network 160 may be the internet, a local area network, or wide area network. In one embodiment, the client computer 150 communicates over network 160 via a web browser 155 to a web server 120. The web server 120 provides access to a multiuser virtual environment application 115 which hosts a chat service 116. The chat service 116 provides safe chat sessions to the client computer 150. The chat service 116 uses a database 110 to store and retrieve information to determine appropriateness of chat conducted on the chat service 116.

In another embodiment, the client computer 140 uses a client application such as an application 145 to participate in the multiuser virtual environment application 115, hosted on the server computing system 105. The multiuser virtual environment application 115 provides chat services 116 for the application 145. In yet another embodiment, a mobile device 125 may use a chat application 135 or a mobile browser 130 to participate in chat session hosted on the server computing system 105. Alternatively, the client computer 140 may be a gaming console which plays the application 145. The chat environment 100 is included to be representative of a variety chat environments allowing users to communicate with one another.

Figure 2:
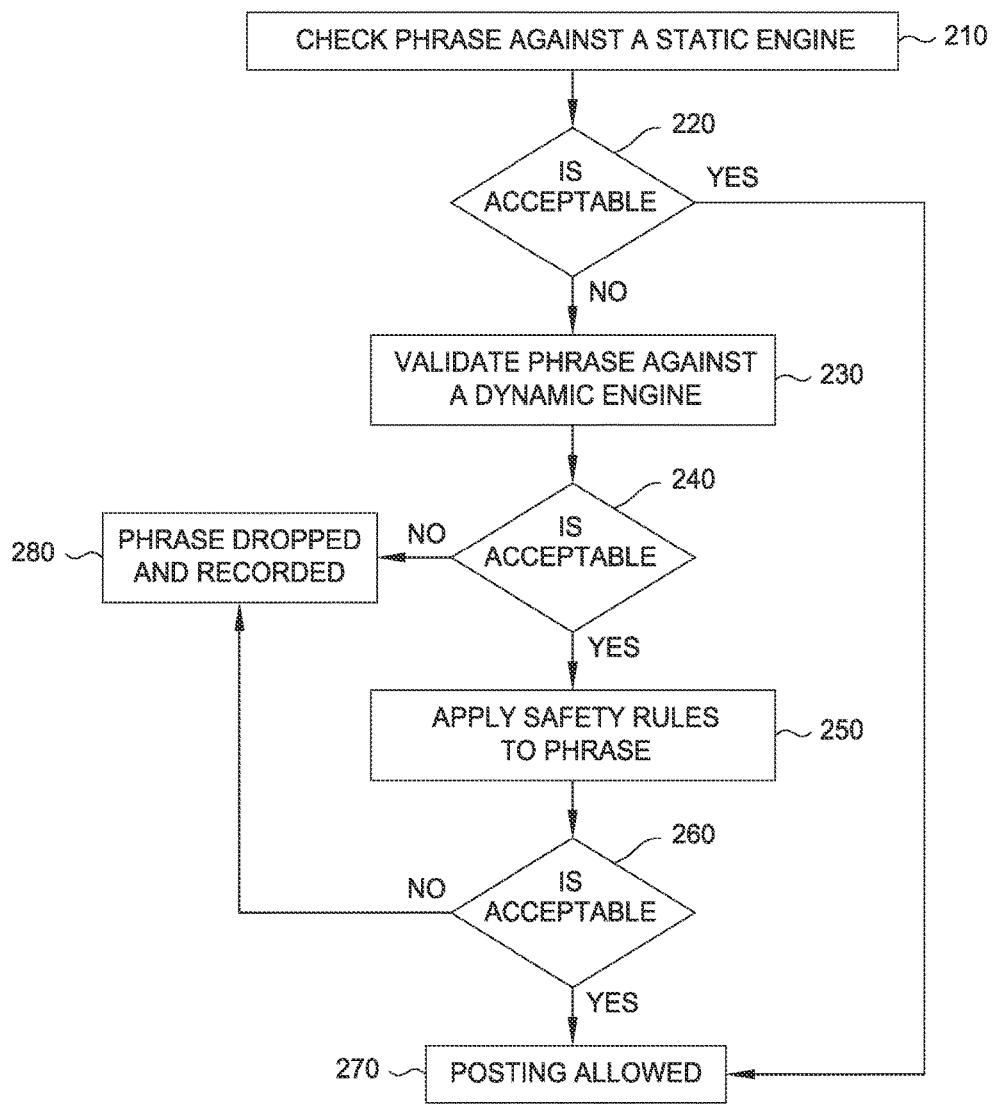
FIG. 2 illustrates an method for validating safe chat, according to one embodiment of the invention.

FIG. 2 illustrates an method 200 for validating chat messages, according to one embodiment of the invention. In step 210, a phrase is checked against allowable phrases in a static engine. The static engine maintains a database of approved phrases. The phrases are loaded into a data structure in memory for traversal while comparing words and word combinations. A search is performed in the data structure to determine if words or combinations of words present in the chat phrase match any of the words or word combinations in the data structure. Each word as well as the order of the words in the phrase is analyzed while traversing the data structure. Upon determining that a match exists for the phrase in the data structure present in memory, the phrase is authorized and allowance is granted for posting of the phrase in step 220. If the phrase does not match a static phrase (or combination of phrases) in the static engine, the chat message under consideration may be evaluated by a dynamic engine.

In step 230, the dynamic engine attempts to verify the acceptability of a phrase. Step 230 is described in greater detail below relative to a discussion of FIGS. 4, 5 and 6. A dynamic engine consists of phrase templates and words annotated for grammatical and semantic information and have layers of safety built into it. Specifically, each word in the dynamic chat engine is annotated with grammatical and semantic information. Words that are derogatory in meaning or primarily used as verbal abuse are blocked.

In one embodiment, the dynamic engine includes templates. Further, the dynamic engine may divide a phrase into words, or tokens, where each token represents a single word. For example, the dynamic engine could decompose the phrase "I saw that" into three tokens. The first token is the word "I". The second token is "saw". And the third token for the phrase is the word "that". The tokens are annotated with the grammatical and semantic information for insertion into the templates.

In step 240, a template is used to determine the acceptability of a phrase. Then a set of phrase templates that govern combinations of possible words are checked to determine safe chat. For example "pizza" and "donut" could be annotated with "noun_food" while "eat", "eating", "munch" and other consumption and cooking verbs are annotated as "verb_eat". A phrase template such as "verb_eat" followed by "noun_food" would permit a phrase like "eats pizza". The phrase "eats pizza" would then be checked against the safety rules in step 250.

However a phrase like "eats Cadence" would not be permitted because "Cadence" is labeled as a "noun_people" and cannot appear in the object position of an eating verb in the templates. Hence, a phrase like "eats Cadence" would be dropped at (step 280).

Stopping words that are inherently derogatory and using phrase templates are not enough to preclude:

a) word combinations that abide by the templates yet create inappropriate metaphorical meaning; and b) word combinations that spell bad words across a line. For example, "swallow banana" is an inappropriate phrase that passes the template "verb_eat, noun_food", yet should be blocked due to potentially inappropriate meanings (at least for some online environments). However, the template verb_eat, noun_food cannot be disallowed as it is needed and very common in chat. Similarly, "nah ik it" combines two interjections used to express an emotion or sentiment on the part of the speaker and the word "it" that together spell "naked". To identify these bad word combinations a phrases that may otherwise be validated by the dynamic engine have safety rules applied to them.

Provided the dynamic engine validates a chat message the phrase is then evaluated against the safety rules (step 250). The semantic component evaluates annotations associated with words as well as rules that dictate which safe annotations are allowed/prohibited from combining with each other. For example, while "swallows entire pizza" is ok, "swallows huge banana" while appropriate, may convey inappropriate meanings. Accordingly, in one embodiment, the safety rules prohibit a phrase that otherwise matches a template (as determined by the dynamic engine) or matches a phrase in static phrase dictionary (as determined by the static engine). To permit "swallows"+"pizza" while blocking "swallows"+"banana", the safety schema includes safe annotations on words that indicate whether a word can be used as a metaphor for: sexual, violent, bullying, hacking, substance abuse, or Personally Identifying Information (PII) content, to name a few. In the above example "banana" is a sexual noun and "swallow" is a sexual verb. The two words ("swallows"+"banana") cannot combine together due to a safety rule that prohibits a phrase composed from two words annotated to indicate they can convey a sexual meaning. In contrast, "pizza" does not have a sexual connotation and therefore can combine with "swallow". Note, unlike block lists, the semantic component can prevent any word with a sexual connotation from combining with any other word with a similar connotation.

The safety schema provides rules that specify which unsafe categories cannot combine with others. For instance, another safety rule could provide that no unsafe category can combine with a personal pronoun or a possessive pronoun (e.g. my banana or grab me). However, since pronouns and nouns describing people are perfectly safe in general, they are OK to combine with each other. There are additional safety rules which are discussed below. What's more, new or trending words are also scrutinized for determining the suitability of a phrase.

In step 260, the acceptability of a phrase is determined after applying the safety rules in step 250. At step 270, a phrase that is not prohibited by the safety rules is sent to a message recipient. In contrast, if a phrase is unacceptable, the phrase would be dropped and a record made (step 280).

Figure 3:
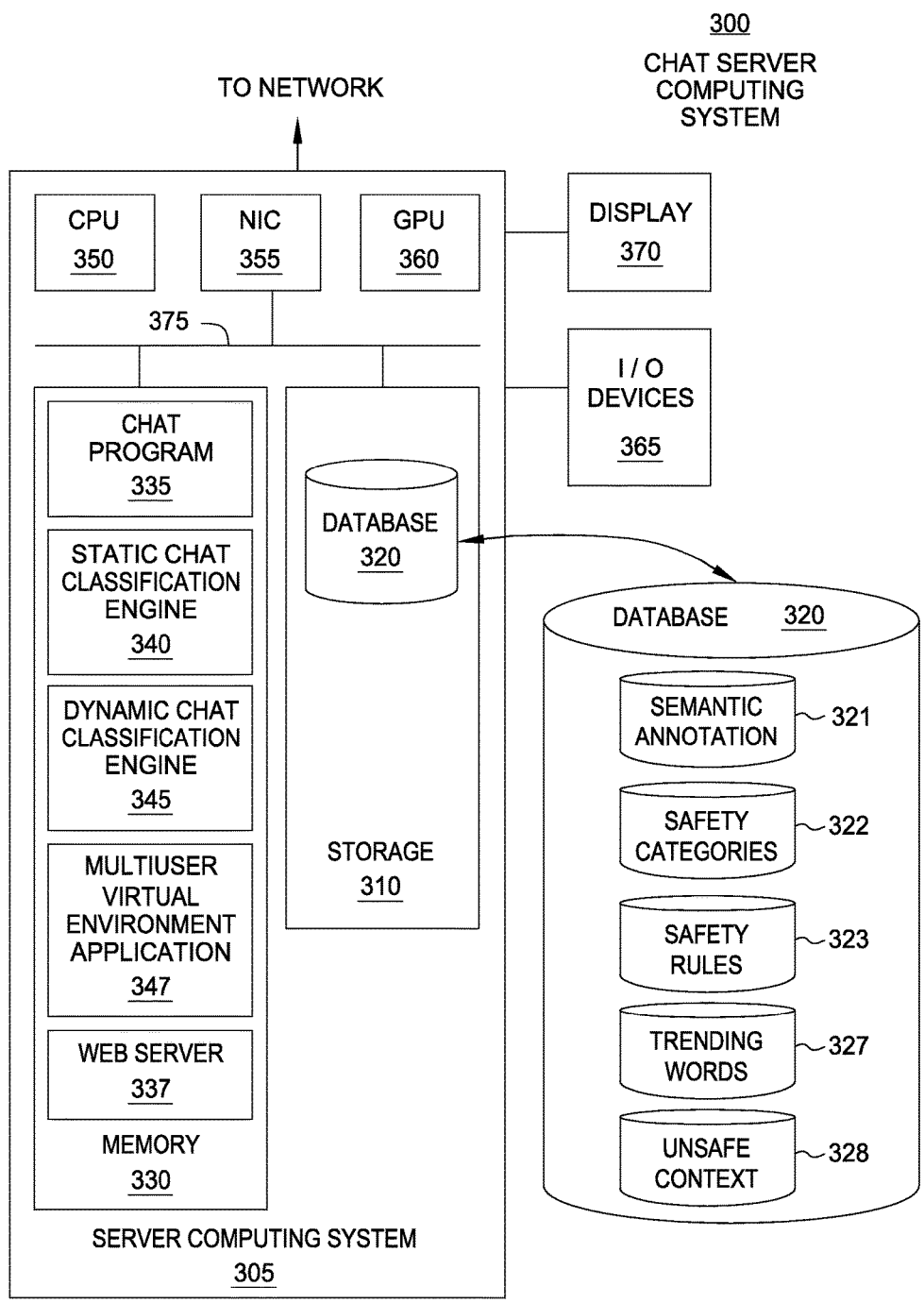
FIG. 3 illustrates an example chat server computing system, according to certain embodiments of the present disclosure.

FIG. 3 illustrates an example chat server 300, according to one embodiment. As shown, the server computing system 305 includes a CPU (central processing unit) 350, a NIC (network interface card) 355, a GPU (graphical processing unit) 360, memory 330, storage 310, and a bus 375. The server computing system 305 is connected to a display 370, and an input/output (I/O) device 365. The server computing system 305 is included to be representative of a variety of computing systems, including, e.g., tower server, rack mount server, a desktop computer, a laptop computer, or variety of other computing devices capable of providing chat services to other devices.

The chat services may be viewed on the display device 370, e.g., monitor display and controlled using input devices 365, e.g., a keyboard, mouse. CPU 350 and GPU 360 are programmable logic devices that execute instructions, logic and mathematical processing, and may be representative of one or more CPUs or GPUs, multi-core CPUs or GPUs, and the like. The memory 330 represents any memory sufficiently large enough to hold a Multiuser Virtual Environment Application 347, a chat program 335, a web server 337, a dynamic chat classification engine 345, a static chat classification engine 340 and a chat program 335. The static chat classification engine 340 is the same static chat classification engine discussed in step 210 of FIG. 2. The dynamic chat classification engine 345 is the same dynamic chat classification engine discussed in step 230 of FIG. 2. The web server 337 is the same the web server 120 as shown in FIG. 1. Memory 330 could be one or a combination of memory devices, including Random Access Memory (e.g., DRAM modules).

Storage 310 stores application programs and a database 320 for use by the chat program 335. Storage 310 is included to be representative of hard-disk drives, solid-state drives (SSD), flash memory devices, optical media (e.g., CD/DVD/Blu-Ray® discs) and the like. The storage device may be internal to the server computing device 305 or external such as a NAS, SAN, cloud or other storage environment. The database 320 has a number of smaller databases which support the applications in memory 330. The database 320 has semantic annotation 321, safety categories 322, safety rules 323, trending words 327 and unsafe context 328.

The Multiuser Virtual Environment Application 347 provides guests with chat services via a chat program 335. A user may access the Multiuser Virtual Environment Application 347 while online gaming and chat with other online gamers. The chat program 335 receives typed chat phrases from the users and directs the chat to a static chat classification engine 340 to determine if a phrase is acceptable. The static classification engine compares the typed phrase, word by word, against the chat classification resources indexed into memory from the database 320. As an initial test, the phrase is checked against the resources indexed into memory. A phrase found to be acceptable and validated by the static chat classification engine 340 is posted. Messages failing validation by the static chat classification engine 340 are sent to be validated by the dynamic chat classification engine 345.

The dynamic chat classification engine 345 provides semantic annotation 321 from the database 320 to the words in a phrase. The annotation is used to place the words in templates. For instance, the word "apple" is annotated as a noun_food. Therefore a template using "noun_food" in it may apply to a phrase containing the word apple. Matching the sequence of words in a phrase to a template determines whether the phrase may be safe, or not. Words are provided safety categories 322 and safety rules 323 are applied to the phrase along with unsafe context 328. The safety rules 323 include literal safety rules and category rules. For example rules that block "nah ik it" and bad idioms like "birthday suit" and things like "sex_noun,sex_verb" are examples of safety rules. However, the first two="nah ik it" and "birthday suit" may be referred to as literal safety rules, while the latter like "sex_noun,sex_verb" may be referred to as a category rule. Finally the words in the phrase are checked against trending words 327 and the phrase is determined to be acceptable and posted online. In another embodiment, the static classification engine determines a phrase matches an acceptable phrase and posts the phrase.

Figure 4:
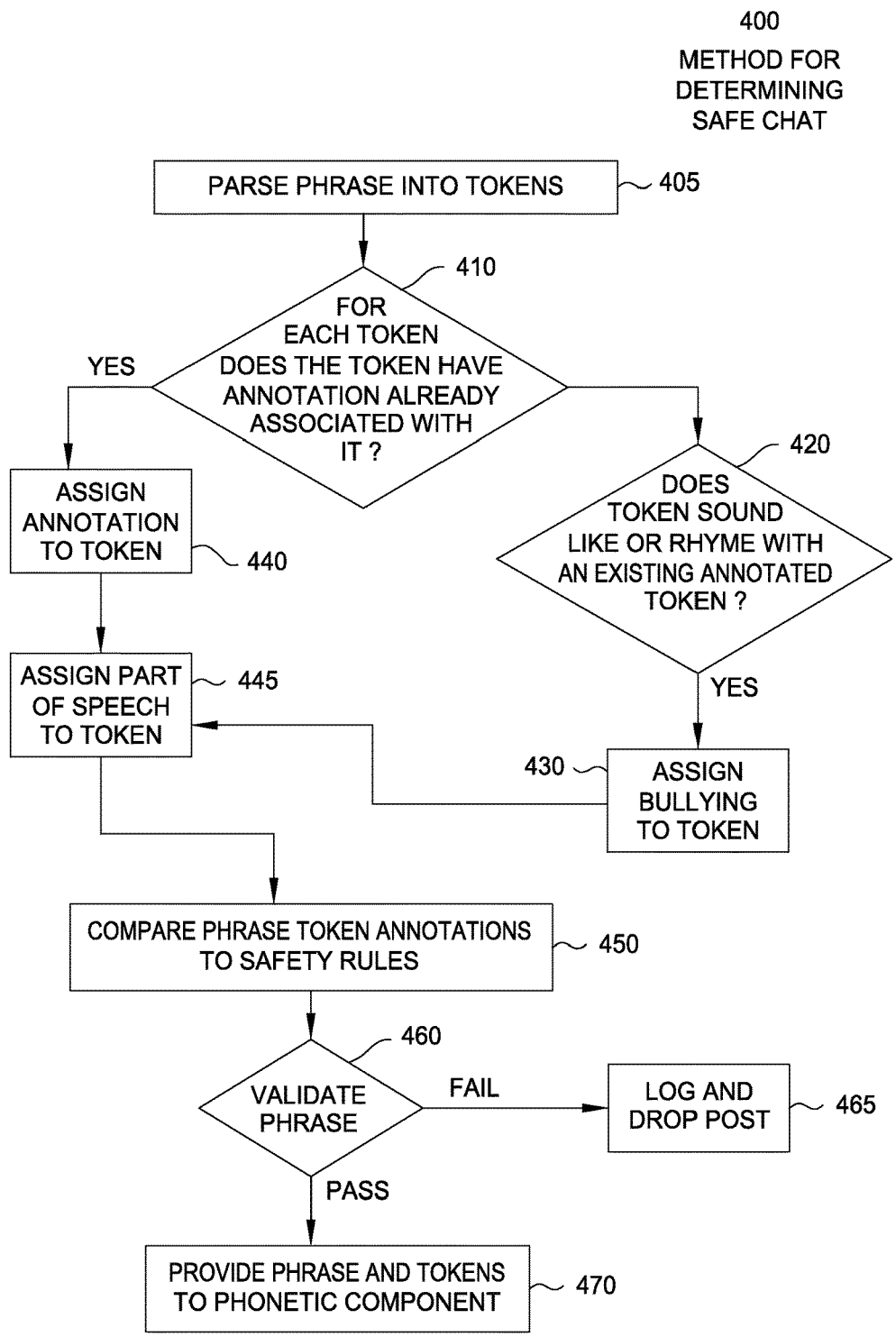
FIG. 4 illustrates a method in a safety schema for identifying semantically conveyed inappropriate language in online chat, according to one embodiment of the invention.

FIG. 4 illustrates a method 400 for identifying inappropriate chat messages, according to one embodiment. The safety schema provides real time analysis of incoming chat. The safety schema controls the use of unsafe metaphors, i.e. the use of good words to produce unsafe metaphorical expressions (e.g. "swallow banana"). The semantic component of the safety schema uses the safe annotations placed on each word in rules that dictate which safe annotations are allowed/prohibited from combining with each other. For example, while "swallows entire pizza" may be an allowed chat, the message, "swallows huge banana" may be prohibited by a safety rule used to identify a phrase that, while matching a dynamic template, is nevertheless inappropriate.

Metaphors used to convey bad meaning typically fall into one of the SIX major categories listed below:
  a) Sex=sexual innuendo
  b) Violence=physical harm is threatened or implied to oneself or others
  c) Bullying=using bad names, racial ethnic slurs, no threats of physical harm to others or oneself
  d) Personally Identifying Information
  e) Substance abuse (drugs, alcohol)
  f) Hacking/cheating in game However, additional categories may be generated when capturing language directed at a particular behavior is desired.

In step 405, a phrase is parsed into tokens. Again, each word, or in some cases group of words, in the phrase corresponds to a token. In step 410 each token is checked against a database to determine whether any safety annotation is already associated with that token. Annotation is a type of metadata for the word which may describe the appropriateness of the word's use in chat, parts of speech it may be used in, as well as categories assigned to the word. To permit "swallows"+"pizza" while blocking "swallows"+"banana" annotations on the words indicate whether a word can be used as a metaphor for sexual, violent, bullying, hacking, substance abuse, or Personally Identifying information content, etc. If annotations are found in the database for a token, the token in the phrase is assigned the annotation (step 440).

If the word does not have any annotations in the database to identify the metaphor category, in step 420, a check is made to determine if a word sounds like a known bad word. In one embodiment, the system considers a word to "sound like" a known bad word if it is one sound apart from the known bad word or rhymes with the bad word. In step 430, the token is categorized as the known bad word found in the database (if a "sounds alike" match is found). For example "beach" is one sound away from "bitch"; "hay, grey" is one sound way from "gay", "stitch" rhymes with "bitch". In these cases, the word would be annotated with the same safety annotation category as the known bad word with which it rhymes with, for example, bullying.

In step 445, the token may also be annotated with a type of speech or other categorization metadata. Thus, "swallows" could be annotated as a verb and "banana" could be annotated as a noun. Therefore, in the above example "banana" is annotated as a sexual noun and "swallow" is annotated as a sexual_verb. A particular word or tokens may also be annotated as belonging to than one category. For example, "banana" belongs to both "noun_food" and also "sex_noun" category. A sample of categories and their examples are given below in Table 1.

subject to a rule that would block the phrase. For example, if a noun with sexual meaning follows a verb with sex meaning a safety rule that blocks "sex_verb, sex_noun" combinations blocks such a phrase from being sent as a chat message. In contrast, "pizza" does not have a sexual connotation and therefore can combine with "swallow". Thus "swallows pizza" would be acceptable.

In step 460, the tokens in a phrase which validated as having passed or failed the safety rules. Safety rules state which safety annotations cannot be combined with other safe annotations. For example, a safety rule such as "sex_verb,sex_noun" is to be read as "A verb that is marked as "sex_verb" CANNOT combine with ANY noun marked as "sex_noun". Safe annotation rules may also be subject to certain conditions listed below. In most cases, unsafe phrases are created when two or more words with inappropriate connotations appear either immediately next to each other, OR with some very few words separating them (for example, less than 4 words). For example, a safety rule such as "sex_verb, sex_noun" applies when the following conditions hold:

1. The order of safe categories within a rule is maintained. "sex_verb, sex_noun" is NOT the same rule as "sex-

TABLE 1

Safe categories and their examples:

| Safe Category | Definition | Example |
|---|---|---|
| sex_noun | sex nouns | rear, period, tummy, baby, newborn, hole, banana, clothes, bun, deck |
| sex_verb | sex verbs | touchy, growing, French, stripe, hmmph, excite, feeling, luck, groans, moans, fork, remove |
| sex_adjective | sex adjective | bare, dirty, easy, hard, single, straight, pink, free, round |
| sex_prep | sex preposition | no, without, up, into, behind, out, on, upon |
| violence_noun | violent nouns | flood (blood), gums, bodies, wound |
| violence_verb | violent verbs | ripe, bunch, poisoned, skilled, damage, fights, forces |
| violence_adj | violent adjectives | red, alone, rough, tragic, painful, depressing |
| bully_noun | bully nouns - nouns that could be used for bullying, foul language, or potty humor | blacks, less, hay, crop, luck, Mexicans, Mia, newbie |
| bully_adj | bully adjectives - adjectives used with bully nouns, foul language, or potty humor | useless, colored, heavy, plump, stupid, ucky, smelly, bad |
| bully_verb | bully verbs - verbs that could be used for bullying, foul language, or potty humor | cursed, yuck, luck, sock, blocking, sheet, stalks, bans, flicks |
| bully_prep | bully prepositions | off, over, on, of, in |
| PII_noun | Personal Identifiable Information noun | goggles, accounts, picture, website, April, house, xbox, tub, messenger |
| PII_verb | Personal Identifiable Information verb | spells, tweet, goggles, message, stalks, calling, ringing, shares, searching, write, lives |
| PII_adj | Personal Identifiable Information adjective | year, teen, alone, legal, old, phony, private, real |
| hacking_noun | hacking nouns | glitches, security, member, application, code |
| hacking_adj | hacking adjectives | free, copyrighted, glitchy |
| subs_abuse_noun | substance abuse nouns | greens, lighter, crystal, speed, smoke, weeds |
| subs_abuse_verb | substance abuse verb | faded, snorts, lighting, puff, passing, rolling, tries, uses, buy, come, do |
| subs_abuse_adj | substance abuse adjective | high, hot, drowsy, medical |
| subs_abuse_prep | substance abuse preposition | over, out |
| pron_people | pronoun people | (all words in category pron_people were tagged) |
| poss_pron_anim | animate possessive pronouns | (all words in category poss_pron_anim were tagged) |
| noun_people | noun people | (all words in category noun_people were tagged) |

In step 450, the annotated tokens are compared against safety rules. If a phrase contains more than one word annotated for one of the above safe categories, it may be _noun,sex_verb". The former blocks "swallow banana", the latter would incorrectly block "banana swallows".

2. The two unsafe words are separated by FEWER than 4 words. For example they may be adjacent (e.g. swallow banana); or the number of words appearing between "sex_verb" and "sex_noun" is fewer than 4 (e.g. swallow big banana; swallow a banana; swallow a very big banana).
3. The rules can permit the combination of two words that have bad connotations but belong to very distant semantic classes of badness. For example, while sex, violence, and bullying belong to semantically closely related classes, sex and PII belong to rather different classes and can in principle safely combine with each other. For example, while "huge banana" (sex_adjective, sex_noun) is clearly inappropriate, "huge name" is ok (sex_adjective, noun_PII).

An innuendo is an insinuation or intimation about a person or thing, especially of a disparaging or a derogatory nature. It can also be a remark or question, typically disparaging (also called insinuation), that works obliquely by allusion. In the latter sense, the intention is often to insult or accuse someone in such a way that one's words, taken literally, are innocent.

Safety annotation rules, as well as safety categories, are very robust cross-linguistically and even though there are some minor changes between languages, they are mostly the same. The rules, with tweaking, may be designed to capture sexual metaphors in Spanish as well as English. The actual words that contain violence or sexual innuendos differ from language to language and thus are captured in the appropriate annotation for those words.

Additionally, some safety annotation rules may encompass "one-offs". The "one-offs" may be required to address elements of language which are ambiguous or not predictable in meaning such as an idiom. For example, the idiom "turn trick" has a strong sexual connotation. However, the combination of "turn" and "trick" may not otherwise satisfy a safety rule. The "one-offs" safety annotation rules may address idioms which have meanings that may not be literal and thus require a specific rule to capture them.

In step 465, a phrase failing validation is logged and the chat message is dropped. In step 470, phrases which pass validation are then checked for the 'sound'-based spelling (Phonetic) abuse. Identifying phonetically conveyed inappropriate language is discussed below in FIG. 5.

Figure 5:
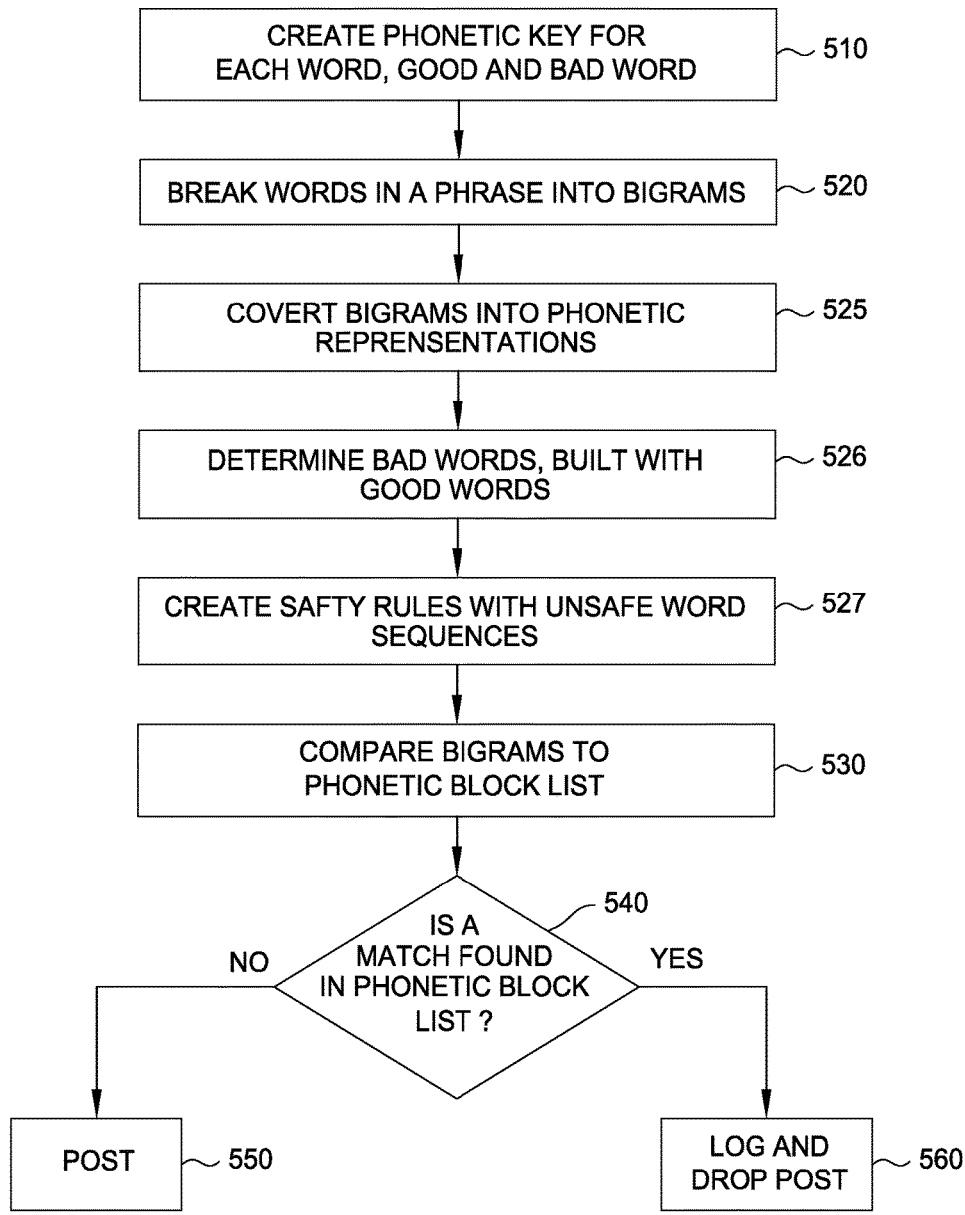
FIG. 5 illustrate an method in a safety schema for identifying phonetically conveyed inappropriate language in online chat, according to one embodiment of the invention.

FIG. 5 illustrates a method 500 for identifying phonetically conveyed inappropriate language in online chat, according to one embodiment of the invention. A phonetic key is created using a set of rules for pronunciation of English words. The same can be done for other languages such as Spanish, Portuguese, French, and German. The phonetic key takes into account such spelling-to-pronunciation rules as "ck" is pronounced as "k", "ca" as "ka", "ce" as "se" etc.

To block phonetically unsafe combinations of safe words, the system generates a literal safety rule via phonetic matching. Such phonetic matching discovers possible combinations of good words that together match known bad words, e.g. (naked="neh ik id"). Because online chat is rife with various abbreviations ("ik, kk") as well as with non-semantic expressions such as "nah, neh, meh" it is not possible to arrive at all, or even most, bad phonetic combinations manually. The main problem with this kind of phonetic language abuse is that there are many short words available for use. Yet, these words are pervasive and very popular in innocent chat. For example the short word "LOL" (meaning "Lots of Laughs") is commonly used as a complete phrase. In addition, due to lack of semantic content, these words (meh, nah, zzz, kk, la, ha) have a very free distribution in phrases. For example, the abbreviations in the phrases "ik, you are here hah" and "hah, you are here, ik" are pervasive in innocent chat.

In step 510, a phonetic key is built for each bad word and each good word and then these phonetic keys are used as the basis for finding combinations of good words that spell (whether accidentally/or not) bad words. A word can be spelled many different ways and still sound the same. Additionally, similar sounding but differently spelled words may be combined together.

Words are indexed by their English pronunciation based on provided rules. One such suitable example for these rules which may be used is the Metaphone codes published by Lawrence Philips in 1990. However, some important departures are made here, for instance, preserving vowels as well as a mapping of diphthong vowels to single vowels. Unlike Metaphone, the three vowels "i, o, and u" are also preserved. All other vowels and vowel combinations (diphthongs such as "ow and "ew" and "oi" etc) are reduced to these. Removing vowels creates phonetic keys that are too generic and therefore may not always be suitable for the current purpose of only blocking phonetically unsafe combinations of safe words.

A phonetic bad word can be represented via adjacent letter pairs called "bigrams". In step 520, each word in a phrase is broken down into a bigram. However, the bigrams do not extend across multiple words in a phrase. For instance, the phrase "cats run" parsed into bigrams would be "ka/at/ts" "ru/un" and not "ka/at/ts/sr/ru/un". A word will have a number of bigrams equal to the number of letters minus 1. Thus the three letter word "run" has two bigrams, (3 letters−1=2 bigrams).

In step 525, the bigrams are converted into their phonetic representations to maximize matching and avoid the many challenges posed by the spelling variations of a word. To illustrate this, consider how many different ways we can build the word "naked":

(1) Naked=nikit (phonetic key for "naked" is "nikit")

(2) Represent nikit via bigrams: ni//ik//ki//it. Recall, the number of bigrams is the number of phonetic letters minus one. So, the 5 letter word "nikit" has 4 bigrams "ni", "ik", "ki", "it". This word can be said using good words to match either each individual bigram or by skipping one bigram, while keeping the first and last bigram intact. This is shown in (3).

(3) nlkld=ni.ik.ki.id match all bigrams neh ik key id; nik kit, neck kit

Ni. lk. It match three bigrams neh ik it; neck it

Ni. Ki. It match three bigrams, skip 2nd neh key it

Phonetic keys are established for inappropriate words. In step 526, the phonetic keys are used to build bad words via the bigrams and an exhaustive, or near-exhaustive, way of extracting actual unsafe safe-word sequences (nah kit, nick it, nick kit . . . ) that correspond to the bigram sequences. That is a determination is made for how many ways bad words can be matched using good words. The bigrams used to represent every possible way of building the bad word are then match to as many as possible sets of bigrams for good words. For example, "naked", phonetically represented as "nikit" can be built 3 different ways as shown in (3) above and matched as shown in table 2 below.

TABLE 2

Good words matching "nikit":

| Ways of building "nikit": | Matching good words: |
|---|---|
| ni//ik//ki//it: match every bigram by a word. | nah(ni) ik (ik) key (ki) it (it) |
| Explanation: Every bigram of "nikit" can be matched by a single word - nah matches "ni", ik matches "ik", key matches "ki", it matches "it". | |
| (ni,ik) //(ki,it): match pairs of bigrams. | nik (ni,ik) kit(ki,it) |
| Explanation: The word "nik" matches the pair of bigrams "ni,ik", while the word kit matches the pair "ki,it". | |
| (ni,ik)//ki//it: match first pair of bigrams, and then individual ones. | nik(ni,ik) key(ki) it (it) |
| ni//(ik,ki)//it: match 2nd and 3rd bigram pair and 1st and 4th bigram. | neh ikky it |
| ni//ik//(ki,it): match the last pair and 1st and second individually. | neh(ni) ik (ik) kit (ki,it) |
| (ni,ik,ki)//it: match first 3 bigrams and the last one. | nikki(ni,ik,ki) it (it) |
| ni//ki//it: match 3 bigrams individually. | neh(ni)/key (ki)/it (it) |
| ni,ki//it: match first pair and the third. | nikki (ni,ki)/it |
| ni//ki, it: match first one and the last pair. | neh (ni)/kit (ki,it) |
| ni//ik//it: match the first and the last two. | neh(ni)/ik (ik)/it (it) |
| ni, ik//it: match the first pair and the last. | nik (ni,ik) it (it) |

The more letters used to spell a given word, the more ways there are to build the word by skipping one or more bigrams (except the first and last bigram), or by using all the bigrams. The phonetic component presents a list of word combinations. These combinations are unsafe because they spell a bad word across a line even though no one word has an unsafe meaning or connotation.

Additionally, the matching problem becomes more complex as the number of possible matches grows significantly with the length of the bad word that needs to be matched due to the subsets of bigrams that need to be considered. Therefore, an approximation is made to block long bad words partially. In other words, if a part of a "path" to a bad word like "nakedness" matches a shorter bad word, there is no need to block the longer word. Simply prohibit the combinations that match "nikit". The resulting literal safety rule may be supplemented with some manually built combinations, however catching all the possible phonetic combinations for building a bad word is difficult.

In step 527, the sequences of safe words having unsafe word sequences are used to populate safety rules with entries blocking those combinations. The safety rule set blocking the inappropriate words make up a "literal safety rule". As before, for words that are longer than 8 bigrams, it typically is not needed to match all the combinations as it becomes difficult to read and is unnecessary. If matches are found for at least the first 3 bigrams, the entire combination may be blocked to ensure nothing suspicious is communicated. For example, if a guest wants to type 3 words that match a path that is known to lead to a bad word "neh ik it" to spell "nakedness", blocking "neh ik it" is appropriate. There is no need to represent the entire word. In another example, a literal safety rule may block the following word sequences:
    Knee grow
    Pet a file; pea to file; pea too file; pea do file
    Pear so nail
    Nah ik id; nah ik it; neck kit
Many more word sequences can be included in the literal safety rule, in which entire word combinations in the list are blocked.

In step 540, a chat message is validated by the comparison of the word sequences with the safety rules in the literal safety rule. A sequence of words matching a rule results in the post failing validation. If the post fails validation, in step 560, the post is logged and dropped.

However, online chat is forever changing. New words, or new uses for old words, make it difficult to keep applying the same rules to the changing environment. To ensure a safe online environment, new trends are identified for the usage of words or phrases to reveal new expressions that would be otherwise difficult to identify in a timely manner.

Figure 6:
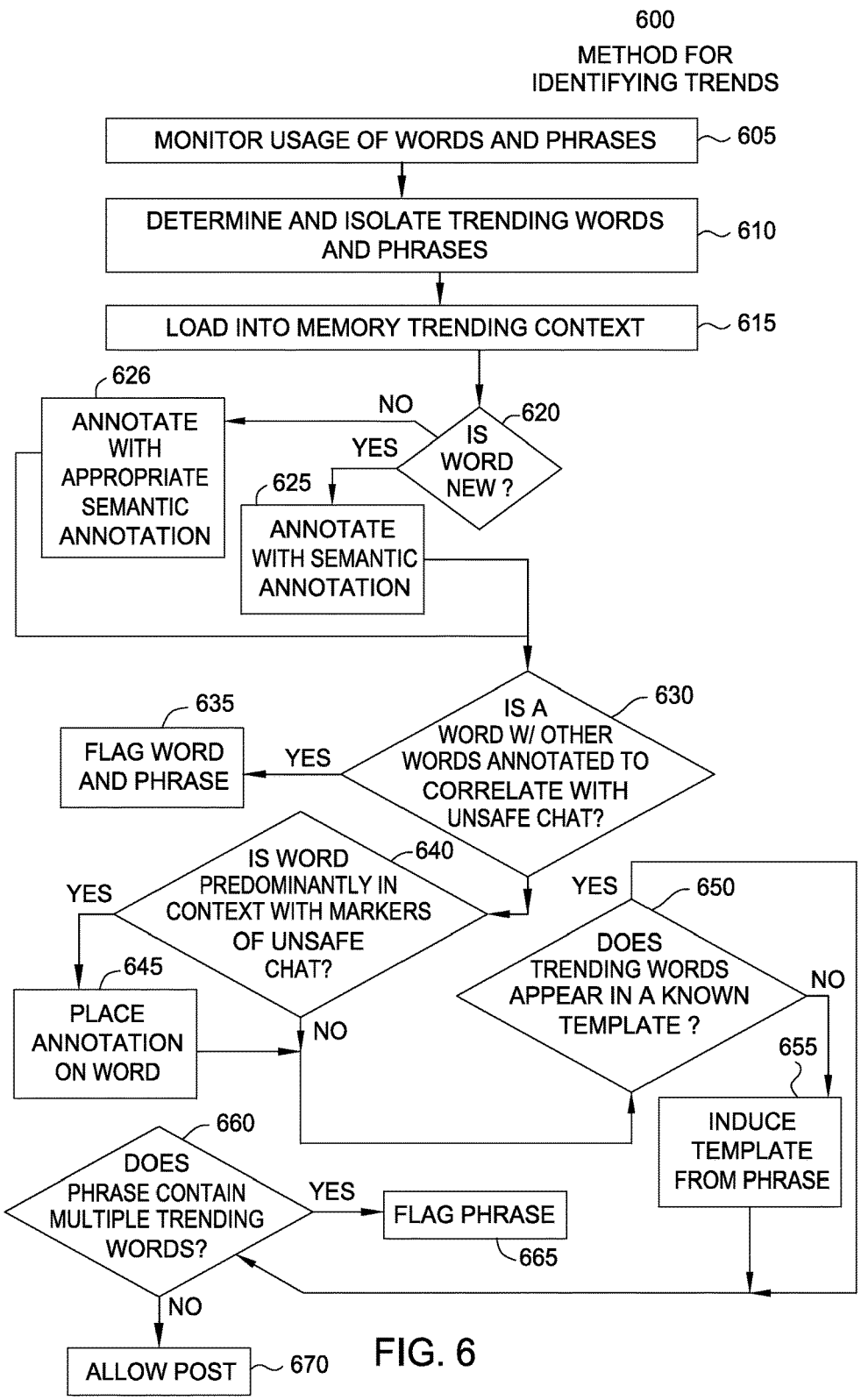
FIG. 6 illustrates a method for identifying trends for words and phrases utilized in online chat, according to one embodiment of the invention.

FIG. 6 illustrates a method for identifying trends for words and phrases used in online chat, according to one embodiment. In step 605, the system monitors words and phrases used in an online environment. For example, the system may monitor words, phrases, and messages to build a frequency of use database for a particular community of users. In step 610, trending words and phrases are identified. A word/phrase is trending if its usage shows a "marked increase" over a short period of time.

How much change over what period of time is required for a "marked increase" can be set as a matter of preferences. However, an increase of 30-50% for the use of a given expression/word within a week has proven to be effective. Therefore, a threshold may be used to determine when a word or phrase is trending. For example, a new words/expression may be determined to be trending when the word/expression count within a certain time frame exceeds a specific threshold such as becoming as frequent or more frequent used than the top 10%-20% of the most frequently used words. The exact threshold may be dependent on a variety of factors unique to a particular site and therefore may be established by experimentation and adjusted accordingly.

There are several distinct scenarios of trending:
1. A new word enters chat in a known grammatical template and starts trending
2. A new word starts trending in a completely novel grammatical template.
3. An existing word starts trending in a new grammatical template
4. An existing word starts trending in a known grammatical template that simply was not popular before. This scenario is more accurately described as one in which a known phrase starts trending.

In one embodiment, new words entering online language can quickly achieve a high level of use. For example, the occurrence count for the new trending word becomes as high as, or higher than the top 10% of the most used words such as "pizza" or "party." Suppose the brand new words "Smerfs" and "tsunami" entered online chat and instantly started to trend. Suppose they are used in the example contexts provided in (1) and (2) as shown here:
    (1) Smerfs at igloo on map (new word, known context)
    (2) Tsunami go igloo (new word, known context)
In step 615, the trending context is loaded into memory. In step 620, a trending word is check to see if the word is "new" or if it is "known". A "known" word is found to exist in the annotated dictionary. The annotated dictionary contains the words and their grammatical and semantic mark up. For example, igloo=noun_place. In step 625, known words are annotated with the semantic annotation provided from the annotated dictionary. If a trending word is known, that too is annotated from the annotated dictionary. In example (1) and (2), the word igloo is annotated with the grammatical and semantic mark up, "noun_place".

If the trending word is new, in step 626, the new word is annotated with the appropriate semantic annotation. For example, new word "Tsunami" is annotated as a noun_event. The annotation for the new word may be performed manually or automated based on words most commonly appearing in a similar template. Further annotation may be added to the new word later based on additional factors discussed below.

In step 630 annotations for words making up the phrase containing the new word are checked for the presence of annotation associated with unsafe chat. In step 635, the presence of annotation correlating to unsafe chat signals the new word and the phrase to be flagged with a safety warning. In one embodiment, the safety schema checks for safety mark up on words surrounding the trending word. The presence of safety markup signals the word and phrase to be flagged for review.

In step 640, new word appearing predominantly in contexts with many markers of unsafe phrases (for instance, in over 70% of its occurrence), have safety annotation placed on the new word that patterns after the safety annotations present in the surrounding context. In example (2) above, new trending word "Tsunami' is surrounded by words which may not have safety annotations and thus would not have additional annotations added to the newly trending word. However, if the new trending word "Tsunami" was found 70% of the time in phrases such as "a dirty Tsunami", the newly trending word "Tsunami" may be annotated in step 645 with safety annotation associated with sex. This is because "dirty" has a safety annotation associated with sex.

In step 650, a trending word usage is checked against known grammatical templates. In example (1) we have a new word "smerfs" appearing in a very common phrasal context "At igloo on map" described by the known grammatical template "preposition_at, noun_place, preposition_on, noun_place. In example (2), new word "tsunami" appears in some new context that does not have a template: "noun_event, v, noun_place". While the phrase sounds bizarre, online chat is rife with grammatically odd language. In these cases, the new words are added into the annotated dictionary. Additionally, a template is induced in step 655 by taking the corresponding annotations from the words in the new phrase of example (2) and creating a template of that phrase. Therefore, "noun_event, v, noun_place" would be added as a new grammatical template for checking future phrases. Building grammatical templates is discussed in more detail along with FIG. 7 below.

In step 660, a phrase is examined for multiple trending words. A phrase found to have multiple trending words is flagged with a safety warning in step 665. Each additional trending word in such a phrase is subject the methods laid out for identifying trending words in the safety schema. Phrases found to satisfy the safety rules are posted in step 670.

Figure 7:
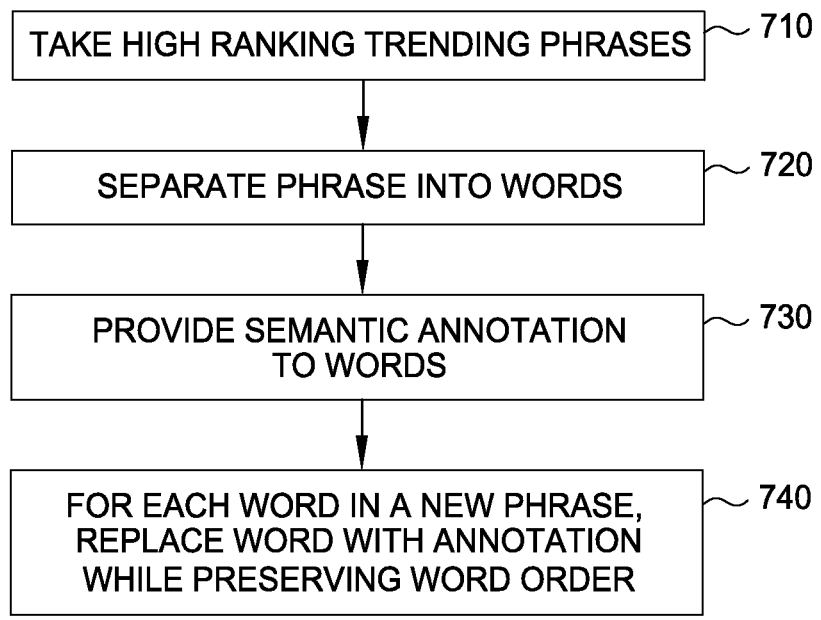
FIG. 7 illustrates a method for building grammatical templates, according to one embodiment of the invention.

FIG. 7 illustrates a method for building grammatical templates 700, according to one embodiment of the invention. In step 710 high ranking (trending) phrases are examined. For example, "like my igloo" is a new trending phrase that has a very high count that has all known words. "smerfs at igloo on map" has one unknown word "smerfs". Both phrases are examined because they are trending phrases.

In step 720, the phrases are parsed in to the separate words. For example, the phrase "like my igloo" parses into the separate words: "like", "my", "igloo". Likewise, the phrase "smerfs at igloo on map" parses into the separate words: "smerfs", "at", "igloo", "on", "map". The order, or location, for each of the separated words in the phrase is maintained in this step.

In step 730, semantic annotation is provided for the separate words in the phrase. The semantic annotation for known words may be retrieved from a database of metadata for the known words. For example, in the phrase "like my igloo", the word "like would provide the semantic annotation (v), "my" would provide the semantic annotation (possessive_pronoun), and "igloo" would provide the semantic annotation (noun_place). The semantic annotation for new words may be determined per the method of determining semantic annotation described in patent application "Comprehensive safety schema for online chat" (Disney Application No.). Using such a method, the semantic annotation for the new word "smerfs" would be (noun_people). Additionally, semantic annotations assigned to words may be further refined depending on a review. For instance, a word such as "like" may be used in a variety of grammatical ways. It may be used as a verb in a phrase such as "I like pizza". Or as a preposition in "his igloo is like a castle". Or even an adjective or a noun. The grammatical usage for the word "like" can typically be determined from surround annotation. However further review may be warranted, in particular, for words being used in new ways.

In step 740, each word in the phrase is replaced by its annotation, while preserving the word order. For example the phrase "like my igloo" may induce the grammatical template: "v, possessive_pronoun, noun_place". Additionally, the phrase "smerfs at igloo on map" may induce the grammatical template: "noun_people, prep_at, noun_place, prep_on, noun_place".

Induced phrase templates are then sent for approval. Once a template is approved, new safe phrase template that minimally differ from the approved template can automatically be created in order to maximize expressivity. The automatically created templates are phrase templates that differ minimally from approved templates in that they involve certain properly positioned functional categories such as articles, auxiliary verbs, conjunctions and interjections. For example, if an induced template such as "verb_eat, noun_food" is approved, several templates can be auto-generated that differs from the approved template by just one or more properly positioned function word. The template "verb_eat, noun_food" may suggest the following new templates and corresponding phrases:

TABLE 3

Example Auto-approved Phrase Templates:

| Template | Phrase |
| --- | --- |
| 1. Aux, v_eat, noun_food | lets eat pizza |
| 2. V_eat, det, noun_food | eat the pizza |
| 3. Conj, v_eat, noun_food | and eat pizza |
| 4. Inter, v_eat, noun_food | hello eat pizza |
| 5. V_eat, noun_food, inter | eat pizza hello |
| 6. Intens, v_eat, noun_food | so eats pizza |
| 7. v_be, v_eat, noun_food | is eating pizza |
| 8. conj, inter, v_be, v_eat, det, noun_food | and now is eating the pizza |

As the example illustrates, templates can be derived from existing templates by applying the rules to the position function of the words in the phrase.

Advantageously, embodiments of the invention provide a variety of techniques for supplying users in an online environment with a safe and effective chat facility. For example, in one embodiment, the allowability of a given phrase (or suggested phrase) is determined dynamically as a user types a phrase (or requests to send a phrase) based on a set of word combinability safety rules. In another embodiment, the chat system is configured to track trending words to preemptively catch new meanings and trends associated with online chat.

While the foregoing is directed to embodiments of the present invention, other and further embodiments of the invention may be devised without departing from the basic scope thereof, and the scope thereof is determined by the claims that follow.

What is claimed is:

1. A computer-implemented method to evaluate a chat message requested to be sent between users of an online game environment having an associated program, the computer-implemented method comprising:
receiving, from a sender in the online game environment, a request to send the chat message in real-time to a specified recipient in the online game environment, wherein the program is configured to:
approve the chat message to be sent to the specified recipient, upon determining that the chat message matches any of a set of preapproved phrases; and
otherwise, deny the chat message from being sent to the specified recipient, upon determining that the chat message contains any prohibited words or any prohibited combinations of words; and
upon determining that the chat message does not match any of the set of preapproved phrases, does not contain any prohibited words, and does not contain any prohibited combinations of words, further analyzing the chat message for approval in real-time, comprising:
denying the chat message from being sent to the specified recipient, upon determining, in real-time by one or more computer processors when executing the program, that the chat message contains a prohibited metaphorical meaning or contains phonetically prohibited language, despite absence of prohibited words and prohibited combinations of words in the chat message;
wherein the program is further configured to approve the chat message to be sent to the specified recipient, upon determining that the chat message does not contain any prohibited metaphorical meaning and does not contain any phonetically prohibited language, whereafter the approved chat message is sent to the specified recipient.

2. The computer-implemented method of claim 1, wherein determining whether the chat message contains phonetically prohibited language comprises:
generating bigrams for each word in the chat message;
replacing the bigrams with phonetic keys to generate a sequence of phonetic keys;
determining whether the sequence of phonetic keys matches a sequence in a literal safety rule; and
upon determining the phonetic keys were identified in the literal safety rule, blocking the chat message from being sent to the specified recipient.

3. The computer-implemented method of claim 1, further comprising:
monitoring each word in the chat message, for a change in a frequency of usage in chat message sent between users of the online game environment;
determining whether the change in usage demonstrates an increase in usage or a new usage; and
responsive to the change in usage exceeding a threshold, generating a report for the word.

4. The computer-implemented method of claim 1, wherein determining whether the chat message contains any prohibited metaphorical meaning includes identifying one or more safety rules, wherein each safety rule identifies an ordered sequence of one or more sets of word types, wherein the request is received by an application configured to:
upon determining at least a first word from one of the sets of words does not match a respective word in the chat message, approving the message to be sent to the specified recipient.

5. The computer-implemented method of claim 1, wherein determining whether the chat message contains any prohibited metaphorical meaning includes identifying one or more safety rules, at least one safety rule of which identifies combinations of words in the chat message which have a secondary semantic meaning.

6. The computer-implemented method of claim 1, wherein determining whether the chat message contains any prohibited metaphorical meaning includes identifying one or more safety rules, at least one safety rule of which includes sub rules to stop applying the at least one safety rule to the chat message and permitting a number of words to be within a sequence of words in the chat message.

7. The computer-implemented method of claim 1, wherein the chat message comprises a first chat message, wherein a plurality of messages is received from the sender to be sent in real-time to the recipient, the plurality of messages including the first chat message, a second chat message, a third chat message, a fourth chat message, a fifth chat message, and a sixth chat message, wherein the first, second, third, fourth, fifth, and sixth chat messages comprise distinct chat messages;
wherein determining that the first chat message contains a prohibited metaphorical meaning or contains phonetically prohibited language comprises determining that the first chat message contains a prohibited metaphorical meaning, wherein the computer-implemented method further comprises:
upon determining that the second chat message matches any of the set of preapproved phrases, approving the second chat message to be sent to the specified recipient, whereafter the second chat message is sent to the specified recipient;
upon determining that the third chat message does not match any of the set of preapproved phrases and contains any prohibited words, denying the third chat message from being sent to the specified recipient; and
upon determining that the fourth chat message does not match any of the set of preapproved phrases and contains any prohibited combinations of words, denying the fourth chat message from being sent to the specified recipient.

8. The computer-implemented method of claim 7, wherein the computer-implemented method further comprises:
upon determining that the fifth chat message does not match any of the set of preapproved phrases, does not contain any prohibited words, does not contain any prohibited combinations of words, and contains phonetically prohibited language, denying the fifth chat message from being sent to the specified recipient; and
upon determining that the sixth chat message does not match any of the set of preapproved phrases, does not contain any prohibited words, does not contain any prohibited combinations of words, does not contain any prohibited metaphorical meaning, and does not contain any phonetically prohibited language, approving the sixth chat message to be sent to the specified recipient, whereafter the sixth chat message is sent to the specified recipient.

9. The computer-implemented method of claim 8, wherein the program includes a plurality of components including a static chat classification engine, a dynamic chat classification engine, and a safety schema component;
  wherein the first chat message is determined not to match any of the set of preapproved phrases by the static chat classification engine;
  wherein the fifth chat message is determined not to contain any prohibited words or prohibited combinations of words by the dynamic chat classification engine;
  wherein the first chat message is determined to contain a prohibited metaphorical meaning by the safety schema component;
  wherein the fifth chat message is determined to contain phonetically prohibited language by the safety schema component.

10. The computer-implemented method of claim 9, wherein the safety schema component includes a plurality of subcomponents including a semantic component, a phonetic component, and a trending component;
  wherein the semantic component is configured to detect whether the first chat message contains any prohibited metaphorical meaning;
  wherein the phonetic component is configured to detect whether the fifth chat message contains any phonetically prohibited language;
  wherein the trending component is configured to monitor usage trends of words and phrases in the online game environment in order to identify new words or combinations of words to approve for sending or deny from being sent.

11. The computer-implemented method of claim 10, wherein determining whether the first chat message contains any prohibited metaphorical meaning comprises:
  identifying word types and usages including a word type and usage for each word in the first chat message;
  identifying one or more safety rules based on the word type and usage, wherein each safety rule identifies an ordered sequence of one or more sets of word types;
  applying the one or more safety rules to the first chat message in order to determine whether a sequence of words in the word types of the first chat message matches a first one of the ordered sequence of one or more sets of word types in the one or more safety rules; and
  determining that a word type, from the first set of word types in the ordered sequence of one or more sets of word types, matches a respective one of the word types of the first chat message.

12. The computer-implemented method of claim 11, wherein determining whether the fifth chat message contains phonetically prohibited language comprises:
  generating bigrams for each word in the fifth chat message;
  replacing the bigrams with phonetic keys to generate a sequence of phonetic keys;
  determining whether the sequence of phonetic keys matches a sequence in a literal safety rule; and
  upon determining the phonetic keys were identified in the literal safety rule, blocking the fifth chat message from being sent to the specified recipient;
  wherein monitoring usage trends of words and phrases in the online game environment comprises:
  monitoring each word in the first chat message, for a change in a frequency of usage in first chat message sent between users of the online game environment;
  determining whether the change in usage demonstrates an increase in usage or a new usage; and
  responsive to the change in usage exceeding a threshold, generating a report for the word.

13. The computer-implemented method of claim 12, further comprising identifying a part of speech and a safe category for each word, wherein the safe category is selected from a plurality of predefined safe categories including sexual innuendo, violence, bullying, personally identifying information, substance abuse, and cheating, wherein the safe category comprises, in respective instances, each category of the plurality of predefined safe categories;
  wherein the safety rule identifies combinations of words in the first chat message which have a secondary semantic meaning that is prohibited;
  wherein the safety rule includes sub rules to stop applying the safety rule to the first chat message and permitting a number of words to be within the sequence of words in the first chat message.

14. A non-transitory computer-readable storage medium storing a program executable to perform an operation to evaluate a chat message requested to be sent between users of an online game environment, the operation comprising:
  receiving, from a sender in the online game environment, a request to send the chat message in real-time to a specified recipient in the online game environment, wherein the program is configured to:
    approve the chat message to be sent to the specified recipient, upon determining that the chat message matches any of a set of preapproved phrases; and
    otherwise, deny the chat message from being sent to the specified recipient, upon determining that the chat message contains any prohibited words or any prohibited combinations of words; and
  upon determining that the chat message does not match any of the set of preapproved phrases, does not contain any prohibited words, and does not contain any prohibited combinations of words, further analyzing the chat message for approval in real-time, comprising:
    denying the chat message from being sent to the specified recipient, upon determining, in real-time by one or more computer processors when executing the program, that the chat message contains a prohibited metaphorical meaning or contains phonetically prohibited language, despite absence of prohibited words and prohibited combinations of words in the chat message;
  wherein the program is further configured to approve the chat message to be sent to the specified recipient, upon determining that the chat message does not contain any prohibited metaphorical meaning and does not contain any phonetically prohibited language, whereafter the approved chat message is sent to the specified recipient.

15. The non-transitory computer-readable storage medium of claim 14, wherein determining whether the chat message contains phonetically prohibited language comprises:
  generating bigrams for each word in the chat message;
  replacing the bigrams with phonetic keys to generate a sequence of phonetic keys;
  determining whether the sequence of phonetic keys matches a sequence in a literal safety rule; and
  upon determining the phonetic keys were identified in the literal safety rule, blocking the chat message from being sent to the specified recipient.

16. The non-transitory computer-readable storage medium of claim 14, wherein the operation further comprises:

monitoring each word in the chat message, for a change in a frequency of usage in chat message sent between users of the online game environment;

determining whether the change in usage demonstrates an increase in usage or a new usage; and responsive to the change in usage exceeding a threshold, generating a report for the word.

17. The non-transitory computer-readable storage medium of claim 14, wherein determining whether the chat message contains any prohibited metaphorical meaning includes identifying one or more safety rules, wherein each safety rule identifies an ordered sequence of one or more sets of word types, wherein the request is received by an application configured to:

upon determining at least a first word from one of the sets of words does not match a respective word in the chat message, approving the message to be sent to the specified recipient.

18. The non-transitory computer-readable storage medium of claim 14, wherein determining whether the chat message contains any prohibited metaphorical meaning includes identifying one or more safety rules, at least one safety rule of which identifies combinations of words in the chat message which have a secondary semantic meaning.

19. The non-transitory computer-readable storage medium of claim 14, wherein determining whether the chat message contains any prohibited metaphorical meaning includes identifying one or more safety rules, at least one safety rule of which includes sub rules to stop applying the at least one safety rule to the chat message and permitting a number of words to be within a sequence of words in the chat message.

20. A system to evaluate a chat message requested to be sent between users of an online game environment, the system comprising:

one or more computer processors; and a memory containing a program which, when executed by the one or more computer processors, performs an operation comprising:

receiving, from a sender in the online game environment, a request to send the chat message in real-time to a specified recipient in the online game environment, wherein the program is configured to:

approve the chat message to be sent to the specified recipient, upon determining that the chat message matches any of a set of preapproved phrases; and otherwise, deny the chat message from being sent to the specified recipient, upon determining that the chat message contains any prohibited words or any prohibited combinations of words; and upon determining that the chat message does not match any of the set of preapproved phrases, does not contain any prohibited words, and does not contain any prohibited combinations of words, further analyzing the chat message for approval in real-time, comprising:

denying the chat message from being sent to the specified recipient, upon determining, in real-time, that the chat message contains a prohibited metaphorical meaning or contains phonetically prohibited language, despite absence of prohibited words and prohibited combinations of words in the chat message;

wherein the program is further configured to approve the chat message to be sent to the specified recipient, upon determining that the chat message does not contain any prohibited metaphorical meaning and does not contain any phonetically prohibited language, whereafter the approved chat message is sent to the specified recipient.

21. The system of claim 20, wherein determining whether the chat message contains phonetically prohibited language comprises:

generating bigrams for each word in the chat message;

replacing the bigrams with phonetic keys to generate a sequence of phonetic keys;

determining whether the sequence of phonetic keys matches a sequence in a literal safety rule; and upon determining the phonetic keys were identified in the literal safety rule, blocking the chat message from being sent to the specified recipient.

22. The system of claim 20, wherein the operation further comprises:

monitoring each word in the chat message, for a change in a frequency of usage in chat message sent between users of the online game environment;

determining whether the change in usage demonstrates an increase in usage or a new usage; and responsive to the change in usage exceeding a threshold, generating a report for the word.

23. The system of claim 20, wherein determining whether the chat message contains any prohibited metaphorical meaning includes identifying one or more safety rules, wherein each safety rule identifies an ordered sequence of one or more sets of word types, wherein the request is received by an application configured to: upon determining at least a first word from one of the sets of words does not match a respective word in the chat message, approving the message to be sent to the specified recipient.

24. The system of claim 20, wherein determining whether the chat message contains any prohibited metaphorical meaning includes identifying one or more safety rules, at least one safety rule of which: identifies combinations of words in the chat message which have a secondary semantic meaning, or includes sub rules to stop applying the safety rule to the chat message and permitting a number of words to be within a sequence of words in the chat message.

* * * * *

UNITED STATES PATENT AND TRADEMARK OFFICE
CERTIFICATE OF CORRECTION

PATENT NO. : 10,303,762 B2
APPLICATION NO. : 13/873455
DATED : May 28, 2019
INVENTOR(S) : Vita Markman et al.

Page 1 of 1

It is certified that error appears in the above-identified patent and that said Letters Patent is hereby corrected as shown below:

In the Drawings

On sheet 5 of 7, in Figure 5, reference numeral 500, Line 2, delete "PHONETICLY" and insert -- PHONETICALLY --, therefor.

On sheet 5 of 7, in Figure 5, reference numeral 525, Line 2, delete "REPRENSENTATIONS" and insert -- REPRESENTATIONS --, therefor.

On sheet 5 of 7, in Figure 5, reference numeral 527, Line 1, delete "SAFTY" and insert -- SAFETY --, therefor.

In the Specification

In Column 2, Line 8, delete "meaning" and insert -- meaning. --, therefor.

Signed and Sealed this
Tenth Day of September, 2019

Andrei Iancu
*Director of the United States Patent and Trademark Office*